(12) United States Patent
Leclerc et al.

(10) Patent No.: US 8,434,774 B2
(45) Date of Patent: May 7, 2013

(54) VEHICLE SUSPENSION AND PNEUMATIC SYSTEMS

(75) Inventors: Daniel Leclerc, St-Denis-de-Brompton (CA); Christian De Grammont, Sherbrooke (CA)

(73) Assignee: Bombardier Recreational Products Inc., Valcourt (CA)

( * ) Notice: Subject to any disclaimer, the term of this patent is extended or adjusted under 35 U.S.C. 154(b) by 0 days.

(21) Appl. No.: 13/320,841

(22) PCT Filed: May 28, 2010

(86) PCT No.: PCT/US2010/036658
§ 371 (c)(1),
(2), (4) Date: Nov. 16, 2011

(87) PCT Pub. No.: WO2010/138867
PCT Pub. Date: Dec. 2, 2010

(65) Prior Publication Data
US 2012/0056389 A1   Mar. 8, 2012

Related U.S. Application Data

(60) Provisional application No. 61/182,459, filed on May 29, 2009.

(51) Int. Cl.
*B60G 11/00* (2006.01)
*B60G 17/04* (2006.01)
*B60K 13/00* (2006.01)
*B62D 21/00* (2006.01)
*F02M 35/10* (2006.01)

(52) U.S. Cl.
USPC .............. 280/124.157; 123/184.21; 180/68.3; 180/311; 267/64.28; 280/5.514; 280/5.515; 280/124.16

(58) Field of Classification Search .............. 123/195 R, 123/195 C, 198 C, 198 E, 184.21, 184.57; 180/41, 53.1, 53.8, 76, 210, 311, 312, 68.1–68.3; 267/217, 218, 64.11, 64.15, 64.28; 280/5.5, 280/5.502, 5.503, 5.506, 5.507, 5.512, 5.514, 280/5.515, 124.141, 124.145, 124.154, 124.157–124.162
See application file for complete search history.

(56) References Cited

U.S. PATENT DOCUMENTS 2,140,767 A * 12/1938 Sanford ...................... 280/6.158
2,862,725 A * 12/1958 Jackson ...................... 280/6.159
(Continued)

OTHER PUBLICATIONS

International Preliminary Report on Patentability of PCT/US2010/036658; Nov. 30, 2011; Paul Dickson.
(Continued)

*Primary Examiner* — Paul N Dickson
*Assistant Examiner* — Laura Freedman
(74) *Attorney, Agent, or Firm* — BCF LLP

(57) ABSTRACT

A vehicle has a frame, at least one front wheel connected to the frame, at least one front suspension assembly connecting the at least one front wheel to the frame, at least one rear wheel connected to the frame, and at least one rear suspension assembly connecting the at least one rear wheel to the frame. At least one of the at least one front and at least one rear suspension assemblies includes an air spring. A seat is connected to the frame. An engine is connected to the frame and is operatively connected to at least one of the wheels. An air compressor is connected to the frame and fluidly communicates with the at least one air spring for supplying air to the at least one air spring. A control unit is electrically connected to the air compressor for controlling an operation of the air compressor.

16 Claims, 16 Drawing Sheets

U.S. PATENT DOCUMENTS

| | | | | |
|---|---|---|---|---|
| 3,064,994 | A | * | 11/1962 | Limmer ................. 280/6.15 |
| 3,480,293 | A | * | 11/1969 | Fultz et al. ............. 180/41 |
| 3,572,676 | A | * | 3/1971 | Yew ................... 267/34 |
| 3,736,003 | A | * | 5/1973 | Ono ................... 267/64.28 |
| 3,980,152 | A | * | 9/1976 | Manor ................. 180/313 |
| 4,015,859 | A | * | 4/1977 | Hegel et al. ........... 267/64.16 |
| 4,754,792 | A | * | 7/1988 | Braun et al. ........... 152/417 |
| 4,927,170 | A | * | 5/1990 | Wada .................. 280/5.508 |
| 5,540,268 | A | | 7/1996 | Mittal |
| 6,092,498 | A | * | 7/2000 | Lohr et al. ............. 123/90.38 |
| 6,685,174 | B2 | * | 2/2004 | Behmenburg et al. ..... 267/64.28 |
| 6,799,781 | B2 | | 10/2004 | Rasidescu et al. |
| 6,892,842 | B2 | | 5/2005 | Bouffard et al. |
| 7,032,895 | B2 | | 4/2006 | Folchert |
| 7,097,166 | B2 | * | 8/2006 | Folchert .............. 267/64.28 |
| 7,441,789 | B2 | * | 10/2008 | Geiger et al. ......... 280/124.16 |
| 7,862,061 | B2 | * | 1/2011 | Jung ................. 280/124.157 |
| 8,219,262 | B2 | * | 7/2012 | Stiller ............... 701/1 |
| 2003/0217884 | A1 | | 11/2003 | Kawamoto |
| 2007/0158920 | A1 | | 7/2007 | Delaney |
| 2007/0295546 | A1 | | 12/2007 | Maltais et al. |
| 2012/0241236 | A1 | * | 9/2012 | Leclerc et al. ......... 180/68.3 |

OTHER PUBLICATIONS

International Search Report of PCT/US2010/036658; Jul. 28, 2010; Blaine R. Copenheaver.

* cited by examiner

VEHICLE SUSPENSION AND PNEUMATIC SYSTEMS

CROSS-REFERENCE

The present application claims priority to U.S. Patent Application No. 61/182,459, filed May 29, 2009, the entirety of which is incorporated herein by reference.

TECHNICAL FIELD

The present invention relates to a suspension system and a pneumatic system for a vehicle.

BACKGROUND

In many all-terrain vehicles, as well as in other types of vehicles, the vehicle suspension system often includes a sway bar, also known as an anti-roll bar. The sway bar is used to connect laterally opposite wheels. The sway bar helps reduce the tendency of the vehicle to roll such as when the vehicle is turning. However, sway bars add weight and mechanical complexity to the vehicle.

Some vehicles also use air springs in their suspension system. In such vehicles, a compressor or pressurized gas reservoir is used to supply pressurized air or gas to the air springs. However, in systems using a compressor, dust, dirt, and/or water can often enter the compressor along with the air. These can cause a malfunction of the compressor and or the air springs over time. This problem is exacerbated when the vehicle is used in off-road conditions, such as for all-terrain vehicles.

Finally, many users of off-road vehicles bring an air compressor with them when using their vehicle. The air compressor can be used to inflate a flat tire for example, which would otherwise be very difficult due to the remoteness of the locations where off-road vehicles are used. The air compressor can also be used to inflate other things such as an inflatable boat. However, in many off-road vehicles, such as all-terrain vehicles, the amount of storage space on the vehicle is limited. As air compressors can be bulky, storing one on the vehicle takes up a significant amount of the limited storage space.

SUMMARY

An aspect of a present vehicle provides an air compressor for supplying air to two air springs used in the suspension system for the wheels. The two air springs fluidly communicate together. The air lines connected to the air springs are provided with valves. The valves are controlled to prevent air from one air spring from going to the other air spring when the vehicle starts to roll. This helps to reduce the tendency of the vehicle to roll. As such, it is no longer necessary to provide a sway bar between the front wheels to control the vehicle's roll.

Another aspect of the present vehicle provides an air compressor for supplying air to air springs used in the suspension system, wherein the air compressor receives air from the air intake system of the engine of the vehicle. As the air intake system of the engine prevents air, dirt, and water from entering the engine, the air intake system also prevents these from entering the air compressor and air springs.

Another aspect of the present vehicle provides an air compressor mounted to a frame of the vehicle. The air compressor supplies air to air springs used in the suspension system and to an auxiliary air output. The auxiliary air output can be used to inflate, for example, a tire or an inflatable boat or any other inflatable device or to actuate a pneumatic device.

For purposes of this application terms related to spatial orientation such as forwardly, rearwardly, left, and right, are as they would normally be understood by a driver of the vehicle sitting thereon in a normal driving position.

Example embodiments of the present vehicle have at least one of the above-mentioned aspects, but do not necessarily have all of them. It should be understood that example embodiments of the present vehicle may have other aspects not specifically recited herein.

Additional and/or alternative features, aspects, and advantages of embodiments of the present vehicle will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

The present invention will be described with reference to an all-terrain vehicle (ATV) 10 having four wheels 18. However, it is contemplated that aspects of the ATV 10 could be used in other types of vehicles, such as side-by-side recreational utility vehicles (RUVs), and/or in vehicles having less or more than four wheels 18.

Figure 1:
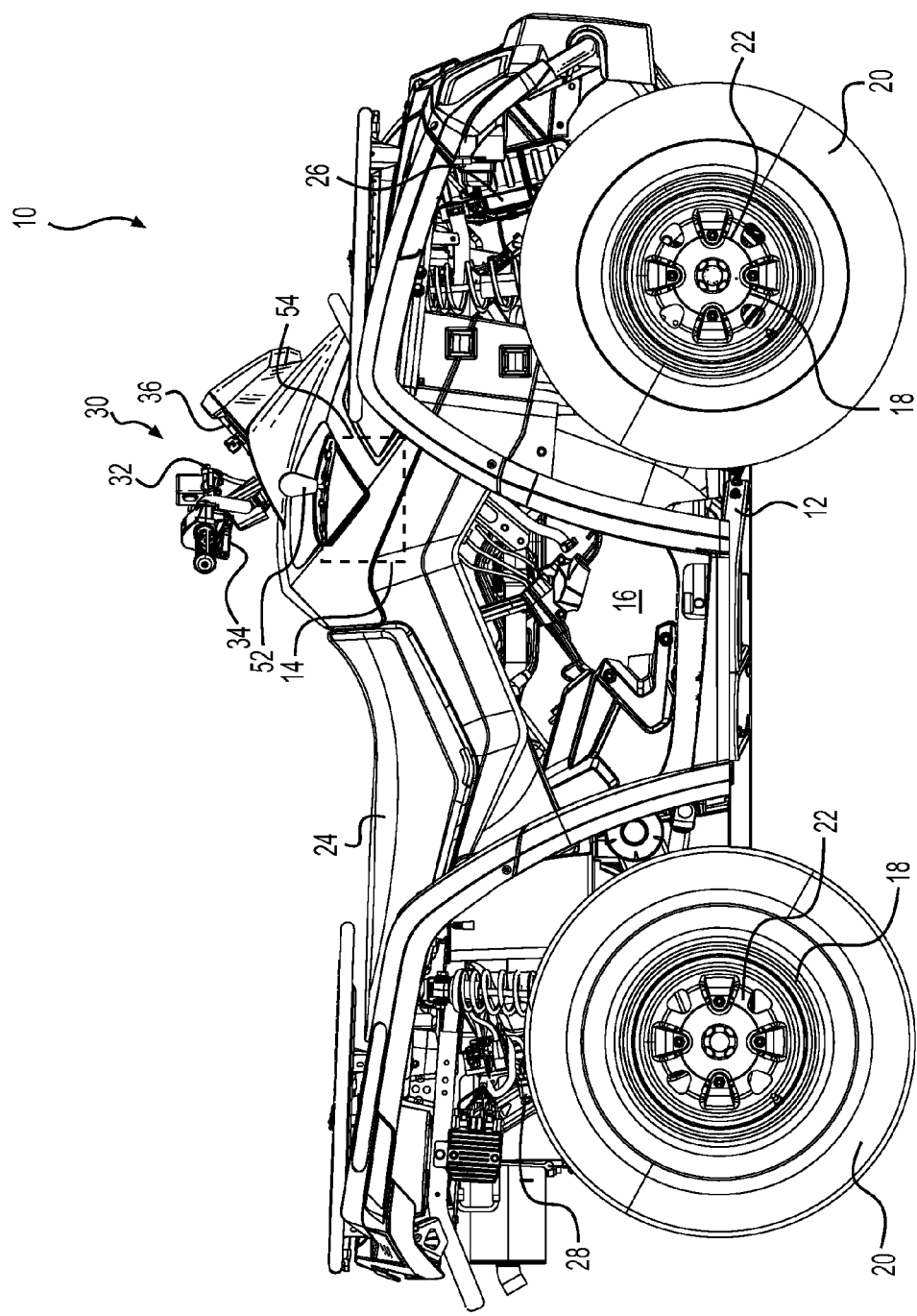
FIG. 1 is a right side elevation view of an all-terrain vehicle (ATV) in accordance with aspects of the present invention.

FIG. 1 illustrates the ATV 10. The ATV 10 has a frame 12 (portions of which are shown in FIG. 1) to which is mounted a body 14 and an internal combustion engine 16 for powering the ATV 10. Also connected to the frame 12 are four wheels 18 with low-pressure balloon tires 20 mounted to rims 22 having a diameter from 25 to 36 cm. It is contemplated that the ATV 10 could have only three wheels 18. The low-pressure balloon tires 20 are inflated to a pressure of no more than 2 kg/cm$^2$ (i.e., no more than 196 kPa or 28 psi) and are adapted for off-road conditions and traversing rugged terrain. The ATV 10 further includes a straddle seat 24 mounted to the frame 12 for supporting a driver and optionally one or more passengers.

The two front wheels 18 are suspended from the frame 12 by respective front suspension assemblies 26 while the two rear wheels 18 are suspended from the frame 12 by respective rear suspension assemblies 28, described in greater detail below.

Still referring to FIG. 1, the ATV 10 further includes a steering assembly 30 which is rotationally supported by the frame 12 to enable a driver to steer the ATV 10. The steering assembly 30 includes a handlebar 32 connected to a steering column (not shown) for actuating steering linkages connected to left and right front wheels 18. A throttle operator in the form of a thumb-actuated throttle lever 34 is mounted to the handlebar 32. Other types of throttle operators, such as a finger-actuated throttle lever and a twist grip, are also contemplated.

Figure 3:
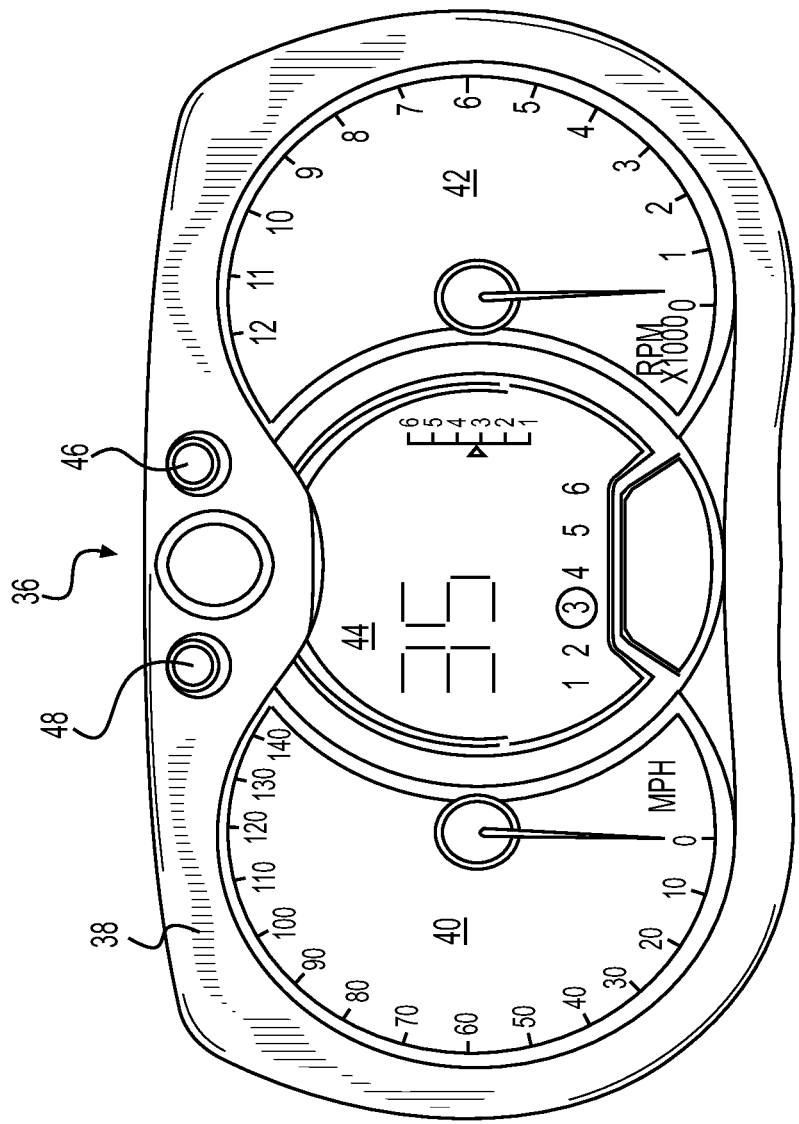
FIG. 3 illustrate a display cluster of the ATV of FIG. 1.

A display cluster 36 is disposed forwardly of the steering assembly 30. As seen in FIG. 3, the display cluster 36 has a frame 38 inside which three gauges 40, 42, and 44 are provided. The gauge 40 displays the speed of the ATV 10. The gauge 42 displays the speed of rotation of the engine 16. The gauge 44 is a digital gauge that can display various information regarding the ATV 10, such as oil level, engine temperature, and also information relating to the suspension system and pneumatic system of the ATV 10 as described in greater detail below. The display cluster 36 also has a mode button 46 and a set button 48. The mode button 46 is used to select which information is displayed on the gauge 44. The set button 48 is used to modify the information displayed and/or to provide inputs related to the information displayed on the gauge 44 to an electronic control unit (ECU) 50 (FIG. 4) of the ATV 10 as described in greater detail below. It is contemplated that additional buttons could be provided on the display cluster 36 or on the handlebar 32 to control additional features of the display cluster 36 and/or to provide additional inputs to ECU 50.

A transmission (not shown) is operatively connected between the engine 16 and the wheels 18 as is known in the art. A shifter 52 located near the steering assembly 30 enables a driver to select one of a plurality of drive modes for the vehicle 10. The drive modes include park, neutral, reverse, low, and drive. A speed sensor (not shown) senses the speed of rotation of one of the shafts (not shown) transmitting power from the transmission to the wheels 18. The ECU 50 sends signals to the various components and systems of the engine 16, such as the throttle valve operator and the fuel injection system, to control the operation of the engine 16 based at least in part on the position of the throttle lever 34. Although shown as having a single ECU 50, it is contemplated that the ATV 10 could have a plurality of ECUs each having one or more dedicated functions.

Figure 4:
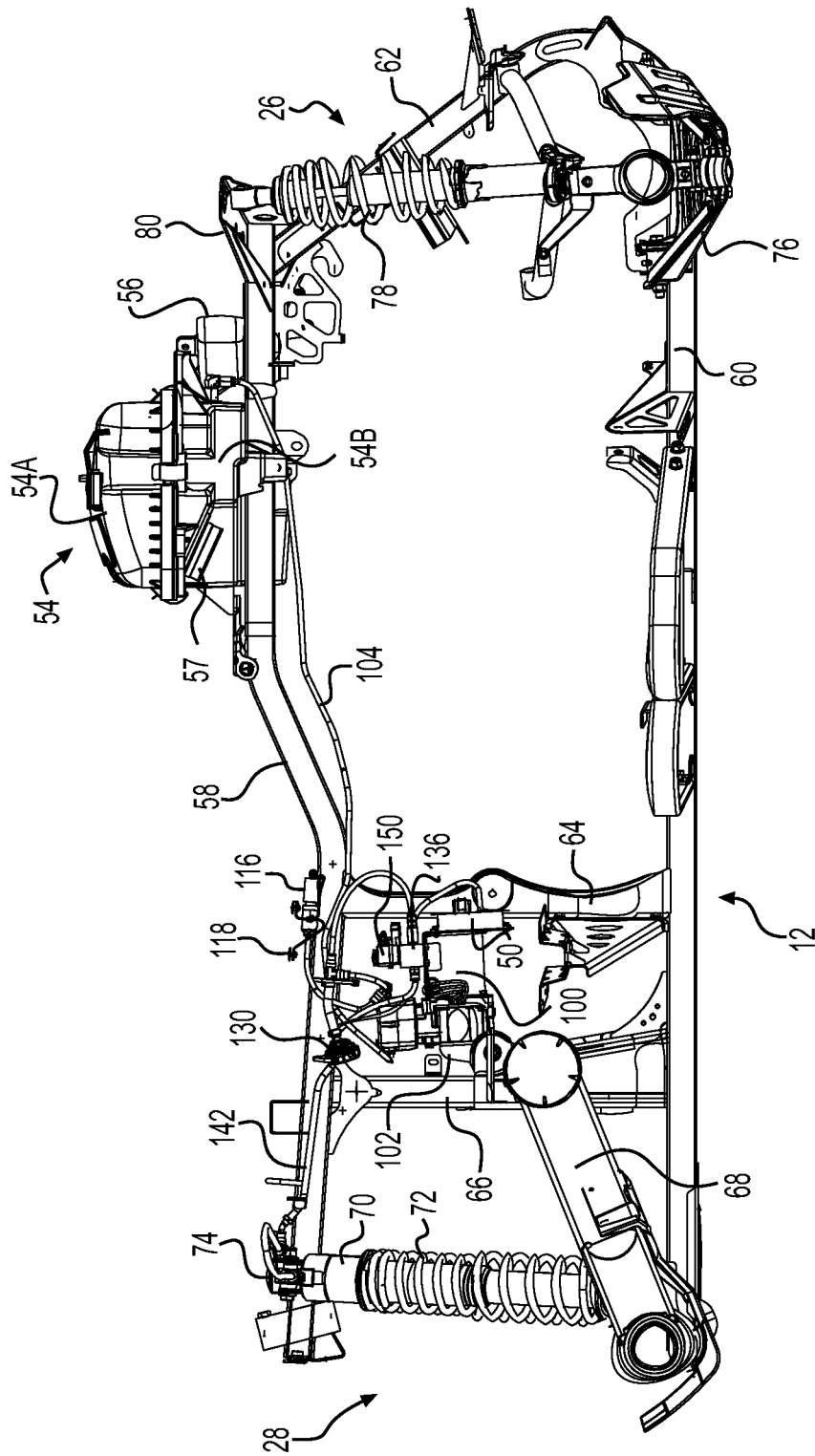
FIG. 4 is a right side view of a frame, a suspension system, and the pneumatic system of the ATV of FIG. 1.
Figure 5:
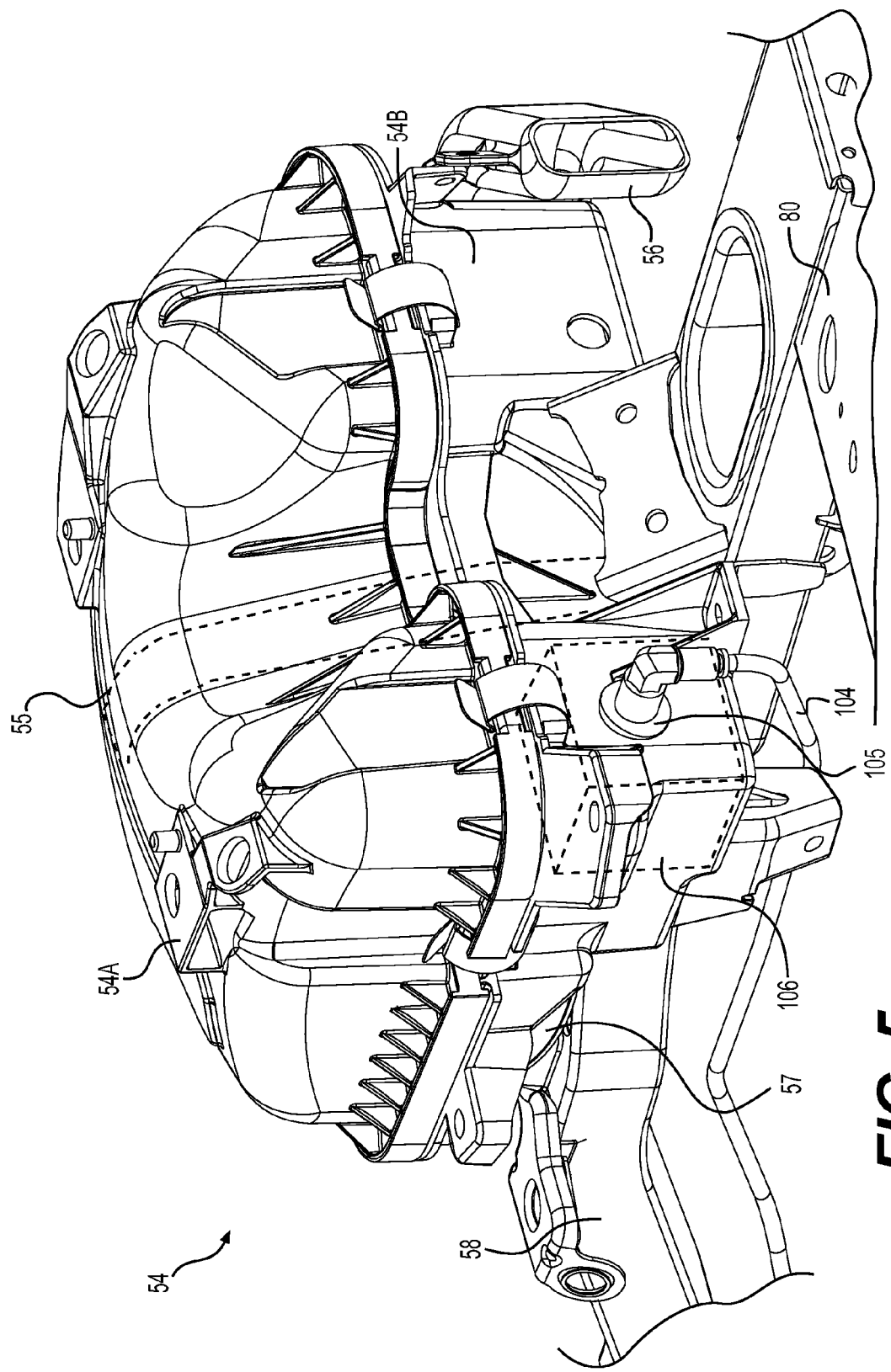
FIG. 5 is a close-up view, taken from a front, right side, of an air box shown in FIG. 4.

Air is supplied to the engine 16 via an air intake system which includes an air box 54 (shown in phantom in FIG. 1, seen in FIGS. 4 and 5). The air box 54 is mounted to the top of the frame 12 behind the steering column (see FIG. 5, note the indentation in the air box 54 and the opening in the frame 12 for receiving the steering column). As such, the air box 54 is disposed higher than the top of the wheels 18, thus reducing the likelihood of water entering the air box 54 when the ATV 10 travels through a body of water, such as when crossing a river. The air box 54 is made of two halves 54A, 54B and has a forwardly facing inlet 56 for admitting air into the air box 54. The air box 54 has a filter 55 (partially shown in dotted lines in FIG. 5) disposed generally vertically, various chambers and passages to reduce the likelihood of water, dirt, and dust entering the engine 16, and for reducing noise from the engine 16. The inlet 56 is position on a first side of the filter. The air box 54 has an outlet 57 disposed on a second side of the filter 55. The outlet 57 is connected to one or more pipes (not shown) which fluidly communicate the air box 54 with the air intake manifold (not shown) of the engine 16.

Turning now to FIG. 4, the frame 12 has an upper frame member 58 and a lower frame member 60 which are connected by a forward frame member 62 and two vertical frame members 64 and 66. As can be seen, the air box 54 is mounted to the upper frame member 58. The frame 12 is also provided with various brackets and other elements as would be known to a person skilled in the art, some of which will be described below. U.S. Pat. No. 6,799,781 B2, issued Oct. 5, 2004, the entirety of which is incorporated by reference, describes in more detail frames similar to the frame 12.

Figure 6:
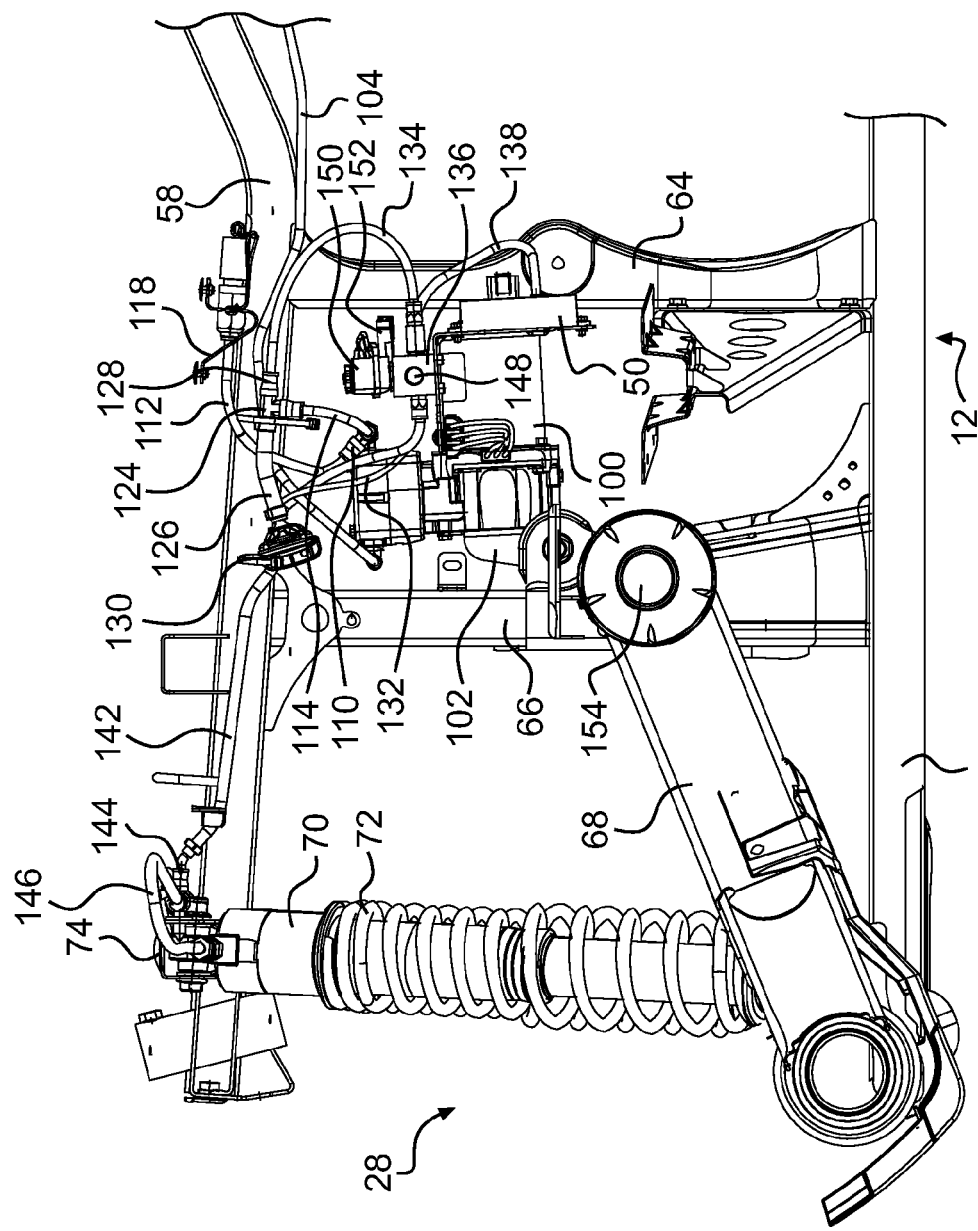
FIG. 6 is a close-up view of a rear, right side of the left portion of FIG. 4.
Figure 7:
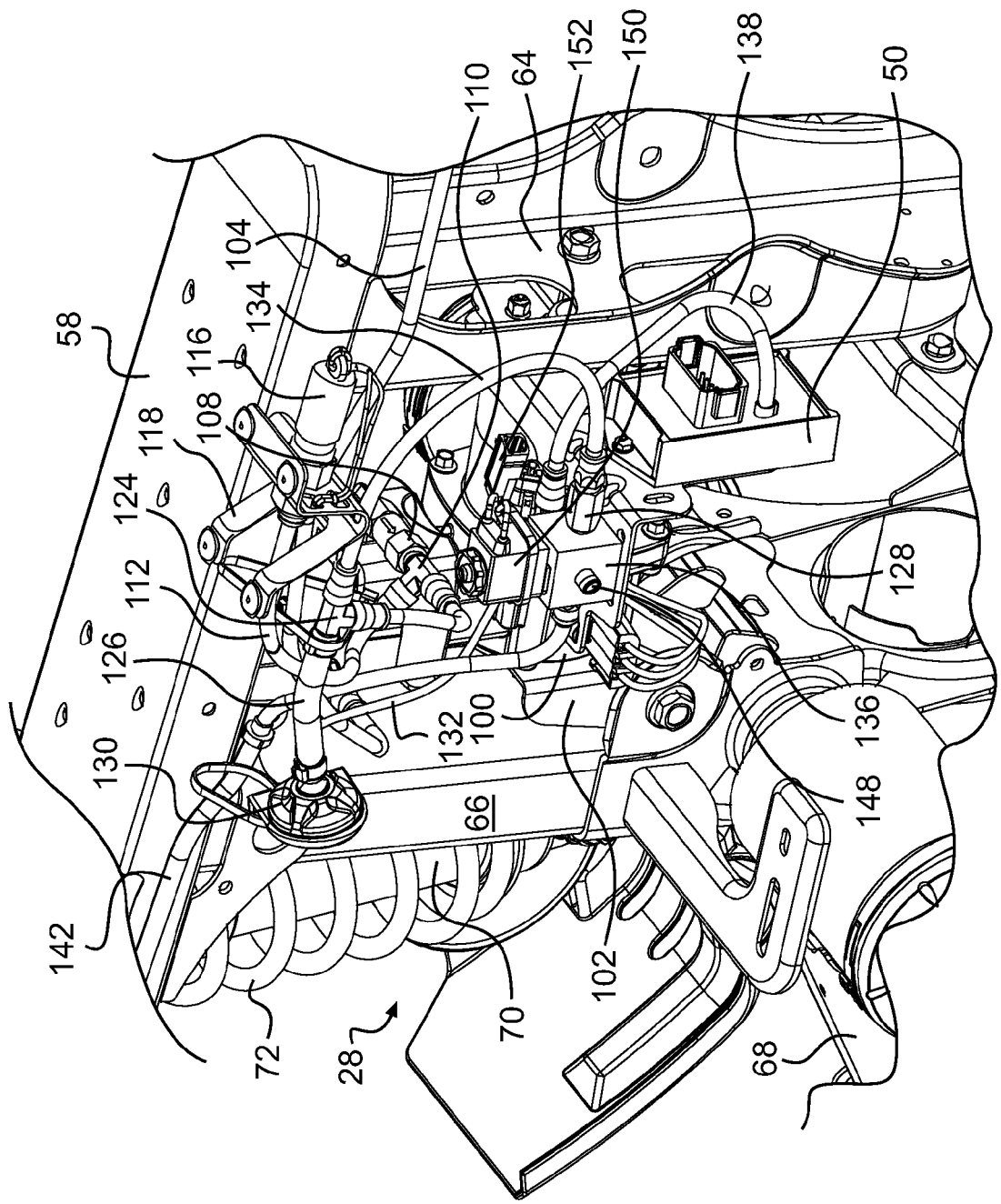
FIG. 7 is a close-up view, taken from a front, right side, of a portion of the pneumatic system shown in FIG. 4.
Figure 8:
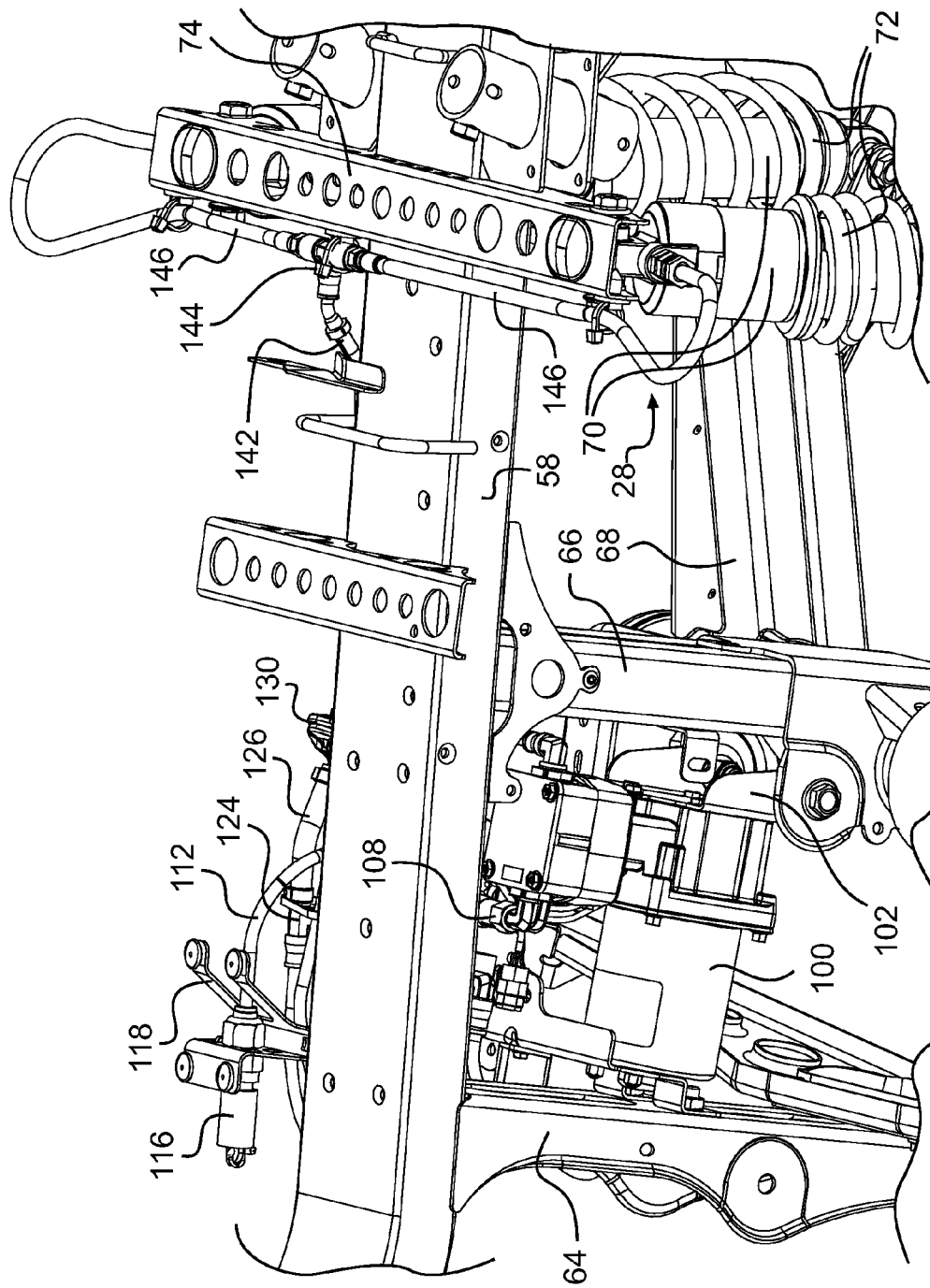
FIG. 8 is a close-up view, taken from a rear, left side, of the portion of the pneumatic system shown in FIG. 4.
Figure 9:
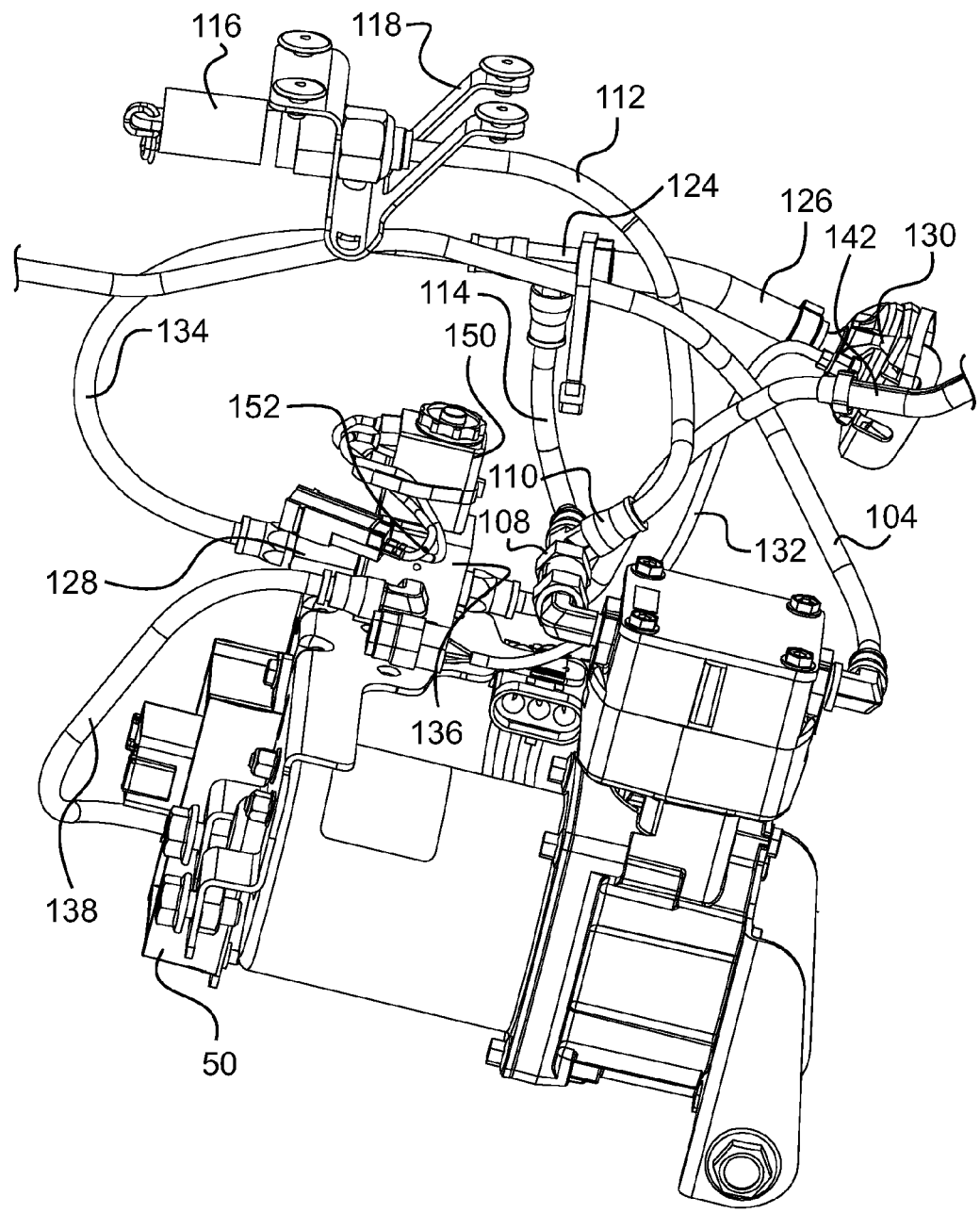
FIG. 9 is a close-up view taken from a rear, left side, of the portion of the pneumatic system shown in FIG. 4 with the frame removed for clarity.
Figure 10:
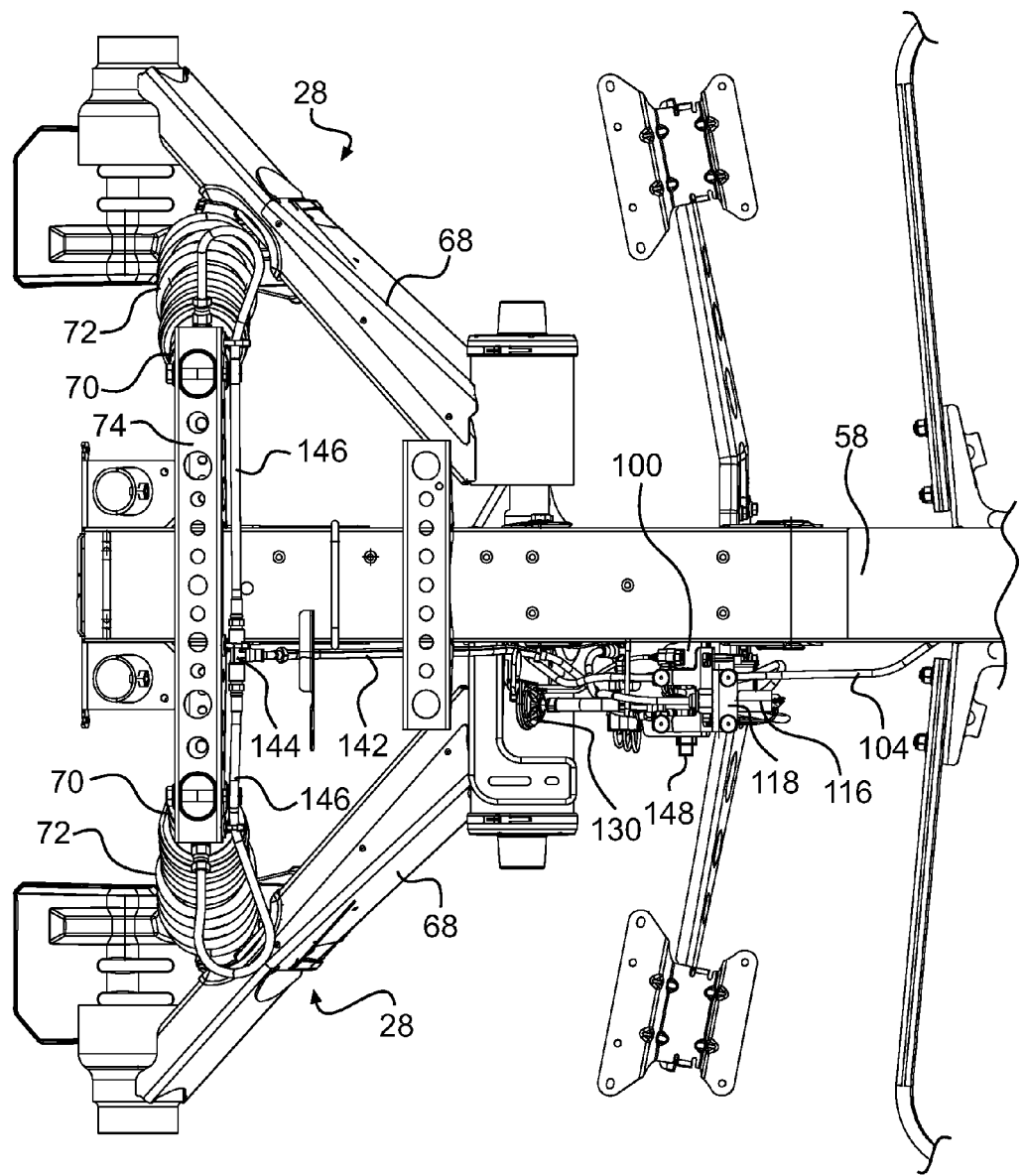
FIG. 10 is a top view of FIG. 6.
Figure 11:
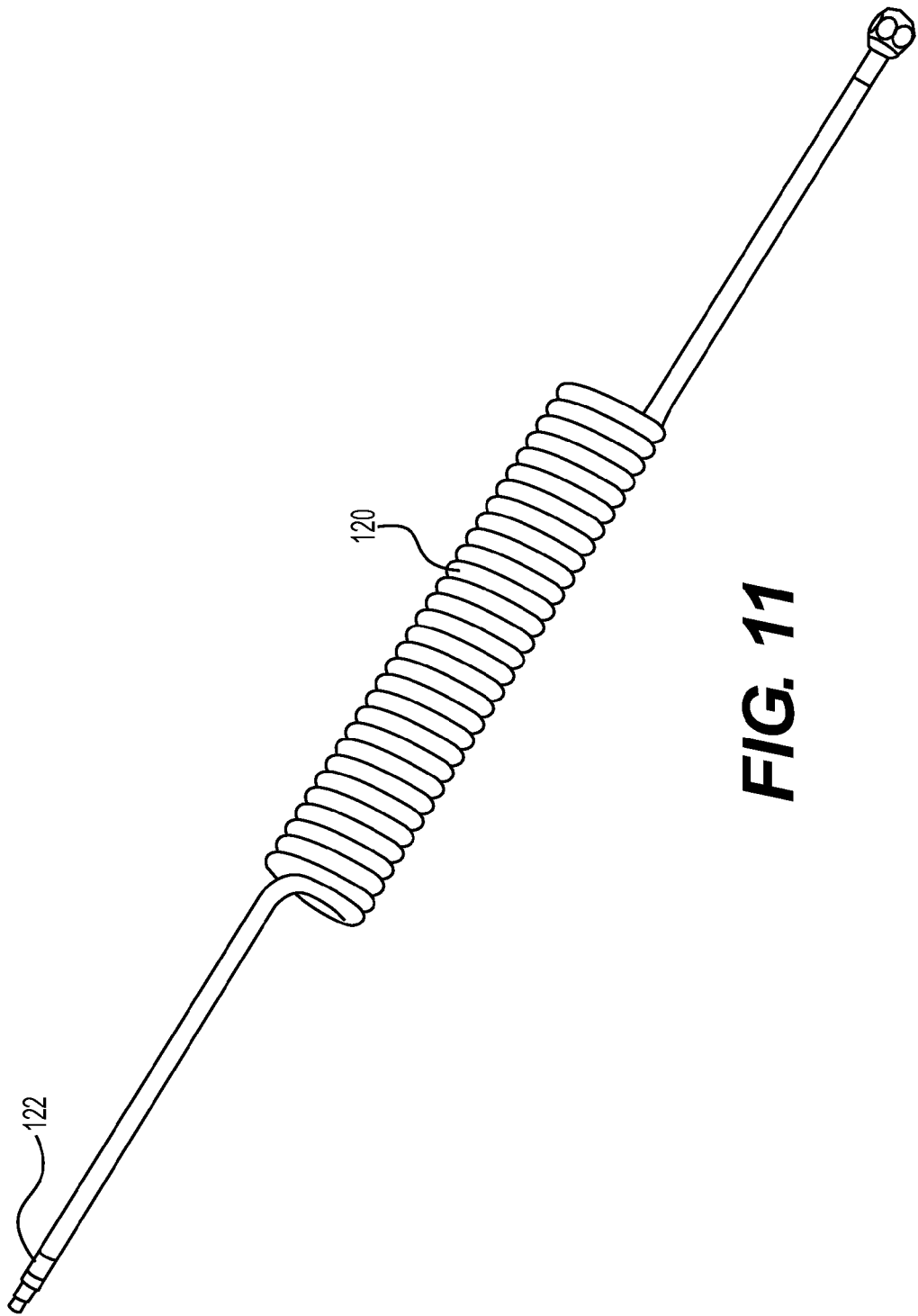
FIG. 11 is a side view of a hose to be connected to an auxiliary air output of the pneumatic system.

As best seen in FIG. 6, each rear suspension assembly 28 consists of a swing arm 68 having one end pivotally connected to the vertical frame member 66 and the other end supporting the axle of its corresponding rear wheel 18. Each rear suspension assembly 28 also has an air spring 70 disposed inside of a coil spring 72. Each air spring 70 has one end pivotally connected to the upper frame member 58 via a bracket 74 and the other end pivotally connected to its corresponding swing arm 68. The air springs 70 provide a variable spring rate which, as would be understood, increases as the air springs 70 are compressed. The range of the spring rates provided by the air springs 70 depends on the pressure of the air initially supplied to them as will be described below. It is contemplated that the air pressure initially supplied to the air springs 70 could vary between 0 psi and 85 psi, but higher pressures are contemplated. It is contemplated that the air springs 70 could be Float R sport shocks manufactured by Fox Factory Inc. Other types of air springs are also contemplated. The coil springs 72 provide a spring rate that is preferably between 7 N/mm and 21 N/mm, and more preferably between 9 N/mm and 19 N/mm inclusively. As can be seen in FIG. 4, each front suspension assembly 26 consists of an A-arm 76 having one end pivotally connected to the lower frame member 60 and the other end supporting the axle of its corresponding front wheel 18. Each front suspension assembly 26 also includes a coil over shock assembly 78, such as those currently used on most ATVs, having one end pivotally connected to its corresponding A-arm 7 6 and the other end connected to the upper frame member 58 via a bracket 80. However, and as will be described with respect to alternative embodiments below, it is contemplated that the coil over shock assemblies 78 could be replaced by air springs disposed inside coil springs as in the rear suspension assemblies 28. It is also contemplated that only the two front suspension assemblies 26 could be provided with air springs.

Turning now to FIGS. 2 to 11, a pneumatic system of the ATV 10 and portions of the electrical system of the ATV 10 associated with the pneumatic system will be described.

The pneumatic system includes an air compressor 100 mounted via a bracket 102 to the vertical frame member 66 in the space between the vertical frame members 64, 66, the upper frame member 58, and the lower frame member 60. The air compressor 100 is preferably disposed higher than a center of the wheels 18 when the ATV 10 is at rest. The air compressor 100 is powered by the electrical system of the ATV 10 (i.e. the battery or magneto, not shown). It is contemplated that the compressor 100 could be a mechanical compressor driven by the engine 16. The compressor 100 receives air from the air box 54 via air line 104 connected to an outlet 105 on lower half 54B of the air box 54. The outlet 105, like the outlet 57, is disposed on a side of the filter 55 opposite the side of on which the inlet 56 to the air box 54 is located. Since the air box 54 is disposed higher than the wheels 18, as discussed above, the likelihood of water entering the air compressor 100 is reduced. An air filter 106 (shown in phantom in FIG. 5) disposed inside the air box 54 near the in let of the air line 104 further prevents dirt and dust from entering the air compressor 100. It is contemplated that one of the filters 55 and 106 could be omitted. It is contemplated that the inlet of the air line 104 could alternatively be connected at other points along the air intake system of the engine 16.

The outlet of the air compressor 100 is connected to a check valve 108 preventing air from flowing back towards the air compressor 100. A T-connector 110 downstream of the check valve 108 splits the air flow between air line 112 and air line 114. The air line 112 is connected to an auxiliary air output 116. The auxiliary air output 116 is mounted via a bracket 118 to the body of the ATV 10 so as to be easily accessible by a user. For example, the auxiliary air output 116 could be located under the seat 24 and be accessible when the seat 24 is removed or pivoted. Alternatively, the auxiliary air output 116 could be mounted to the frame 12. The auxiliary air output 116 is preferably a "quick-connect" connector of the type typically used in pneumatic applications, such as with pneumatic tools, including a built-in check valve. An air hose 120, shown in FIG. 11, having a connector 122 which is complementary to the auxiliary air output 116, can be connected to the auxiliary air output 116, thus allowing compressed air from the air compressor 100 to be used for various applications, such as for inflating a tire for example. When not in use, the air hose 120, is disconnected from the auxiliary air output 116, and is stored in one of the storage compartments of the ATV 10. It is contemplated that the air line 112 could connect the auxiliary air output 116 directly to the air compressor 100 should the air compressor 100 be provided with a second outlet, thus eliminating the need for the check valve 108 and the T-connector 110.

The air line 114 is connected to a T-connector 124. The T-connector 124 splits the air flow between air line 126 and air line 134. The air line 126 is connected to a low pressure sensor 130. The low pressure sensor 130 is electrically connected to the ECU 50 via an electrical wire 132 (portions of which are not shown in FIGS. 4 to 10 for clarity) to send a signal representative of the air pressure between the check valves 108 and 128 to the ECU 50.

The air line 134 is connected to a check valve 128. The check valve 128 prevents air in the pneumatic system downstream of the check valve 128 (i.e. air in the air springs 70) to flow out of the pneumatic system through the auxiliary air output 116 when the auxiliary air output 116 is in use. The check valve 128 is connected to a manifold 136.

The manifold 136 is connected via an air line 138 to a high pressure sensor 140 disposed inside the ECU 50. It is contemplated that the high pressure sensor 140 could be disposed outside of the ECU 50. The high pressure sensor 140 is electrically connected to the ECU 50 to send a signal representative of the air pressure in the air springs 70 to the ECU 50. Since the air pressure inside the air springs 70 can substantially increase when the air springs 70 are being compressed, the high pressure sensor 140 can sense air pressures which are much higher than the low pressure sensor 130 (up to 300 psi for the high pressure sensor 140 vs. up to 100 psi for the low pressure sensor 130, for example).

The manifold 136 is also connected to the air springs 70. An air line 142 connects the manifold 136 to a T-connector 144 which splits the air flow between two air lines 146 connected to the air springs 70 to supply air to the air springs 70.

The manifold 136 also has an outlet 148 to the atmosphere to release air from the air springs 70 or coming for the air compressor 100 to the atmosphere. A solenoid actuated valve 150 is connected to the manifold 136 to control the flow of air from the compressor 100 to the outlet 148 and the air line 142 (i.e. the air springs 70). The solenoid of the valve 150 is electrically connected to the ECU 50 via an electrical wire 152 (portions of which are not shown in FIGS. 4 to 10 for clarity) such that the ECU 50 can send signals to the solenoid to control the position of the valve 150 as will be described below. It is contemplated that the valve 150 could be actuated by a different type of actuator.

Figure 2:
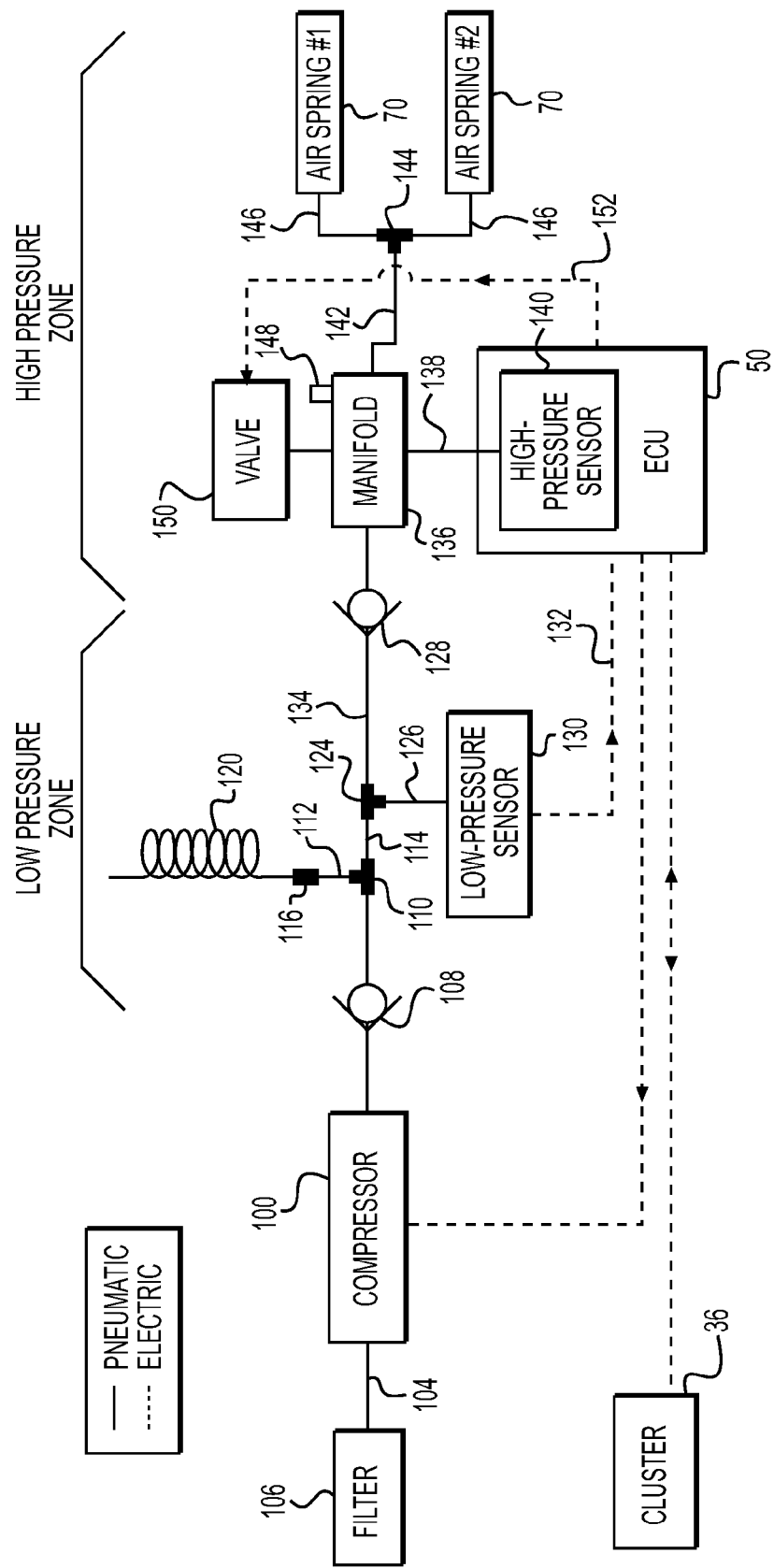
FIG. 2 is a schematic illustration of a pneumatic system and electric system of the ATV of FIG. 1.

As can be seen in FIG. 2, the ECU 50 is also electrically connected to the cluster 36 and the air compressor 100. To set the air pressure in the air springs 70, the user of the ATV 10 first enters an air pressure selection screen of the gauge 44 using the mode button 46 of the cluster 36. The user then selects an air pressure desired in the air springs 70 using the set button 48. The desired air pressure corresponds to the desired air pressure in the air springs 70 when the ATV 10 is at rest. In the example shown in FIG. 3, the user can select one of six preset air pressures. For exemplary purposes only, the six preset air pressures vary from 5 psi (preset 1) to 80 psi (preset 6) in increments of 15 psi. In FIG. 3, the user has selected preset 3 which corresponds to 35 psi. As can be seen, the gauge 44 displays the selected air pressure. It is contemplated that instead of labeling the presets with numbers as shown, that the presets could be labeled with qualitative labels regarding the suspension, such as "smooth", "firm", "sport", etc. It is also contemplated that the user could manually put in any desired air pressure within the operating range of the pneumatic system and the air springs 70. The ECU 50 then determines based on the reading obtained from the high pressure sensor 140 if the air pressure in the air springs 70 corresponds to the air pressure selected by the user. If the air pressure in the air springs 70 is too high, the ECU 50 sends a signal to the solenoid actuated valve 150 to open the outlet 148, thus releasing air from the air springs 70 until the air pressure in the air springs 70 corresponds to the selected air pressure. If the air pressure in the air springs 70 is too low, the ECU 50 sends a signal to the air compressor 100 to operate until the air pressure in the air springs 70 corresponds to the selected air pressure.

As would be understood, when the ATV 10 is in motion (as determined by the speed sensor of the ATV 10), especially over rough terrain, the air pressure inside the air springs 70 constantly fluctuates. Therefore, when the ATV 10 is in motion, the ECU 50 uses an average of the air pressure readings from the high pressure sensor 140 over time to determine whether the readings obtained would result in the air pressure in the air springs 70 corresponding to the selected air pressure if the ATV 10 was at rest. It is contemplated that sensors could also be used to sense the degree of compression of the air springs 70 to assist in making this determination.

Also, during operation of the ATV 10, some of the air could leak out of the air springs 70, thus causing the air pressure in the air springs 70 to drop below the selected air pressure. When this occurs, the ECU 50 sends a signal to the air compressor 100 to operate until the air pressure in the air springs 70 corresponds once again to the selected air pressure.

When the signal sent from the low pressure sensor 130 to the ECU 50 indicates an air pressure that is below the selected air pressure, the ECU 50 determines that the auxiliary air output 116 is in use. Accordingly, the ECU 50 sends a signal to the air compressor 100 to operate until the air pressure reading for the low pressure sensor 130 corresponds once again to the selected air pressure. However, the ECU 50 will stop the operation of the air compressor 100 if it operates for too long, which may damage the air compressor 100. This could occur for example when using the auxiliary air output 116 to inflate something having a large volume while the selected air pressure is low. It is contemplated that a message regarding this temporary interruption could be displayed on the gauge 44.

Turning now to FIGS. 12A to 15, various alternative embodiments of the pneumatic system and electrical system described above will be described. For simplicity, elements of these embodiments which are similar to those described above have been labeled with the same reference numerals and will not be described again in detail.

Figure 12A:
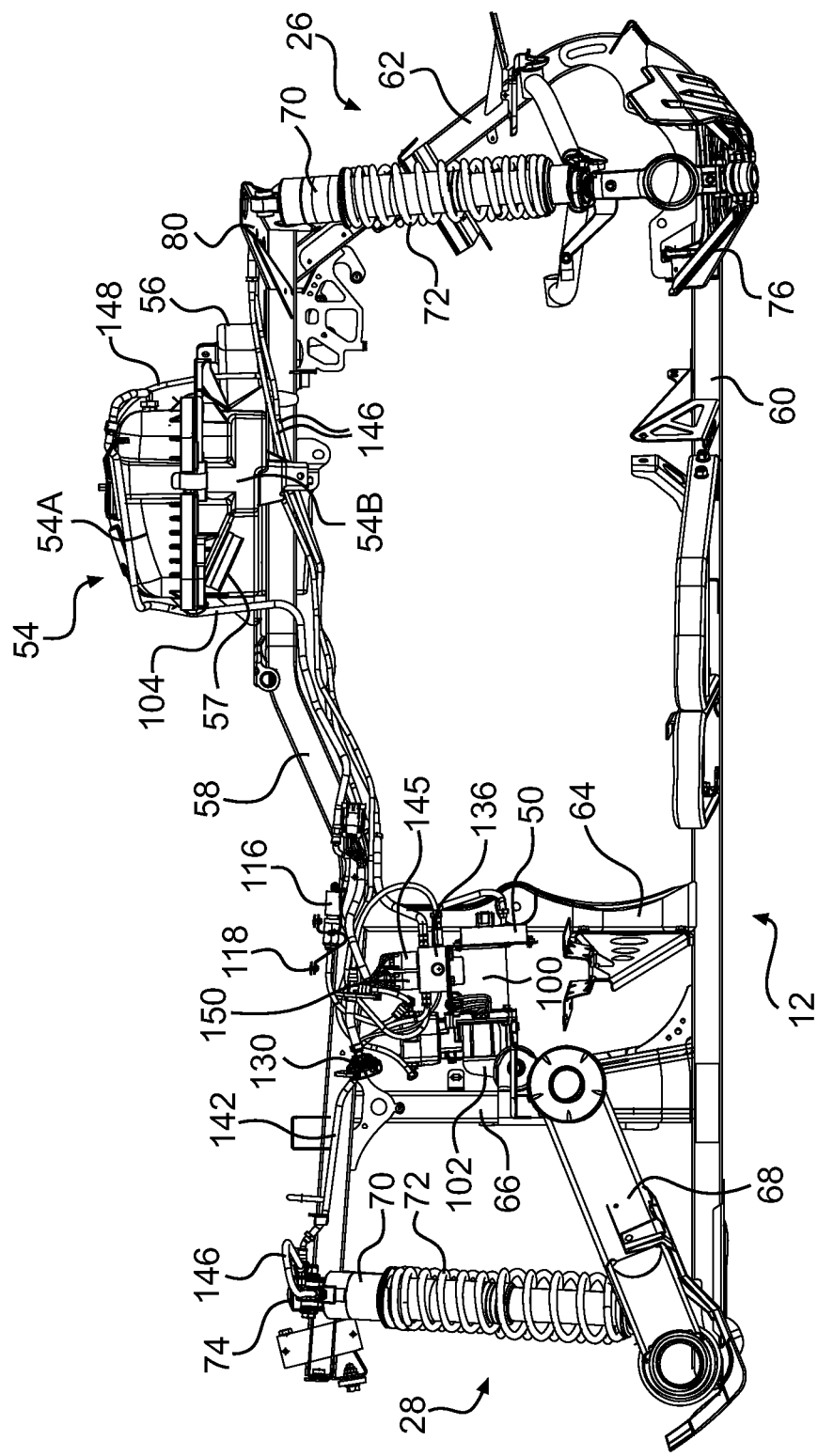
FIG. 12A is a right side view of a frame, a suspension system, and an alternative pneumatic system of the ATV of FIG. 1.
Figure 12B:
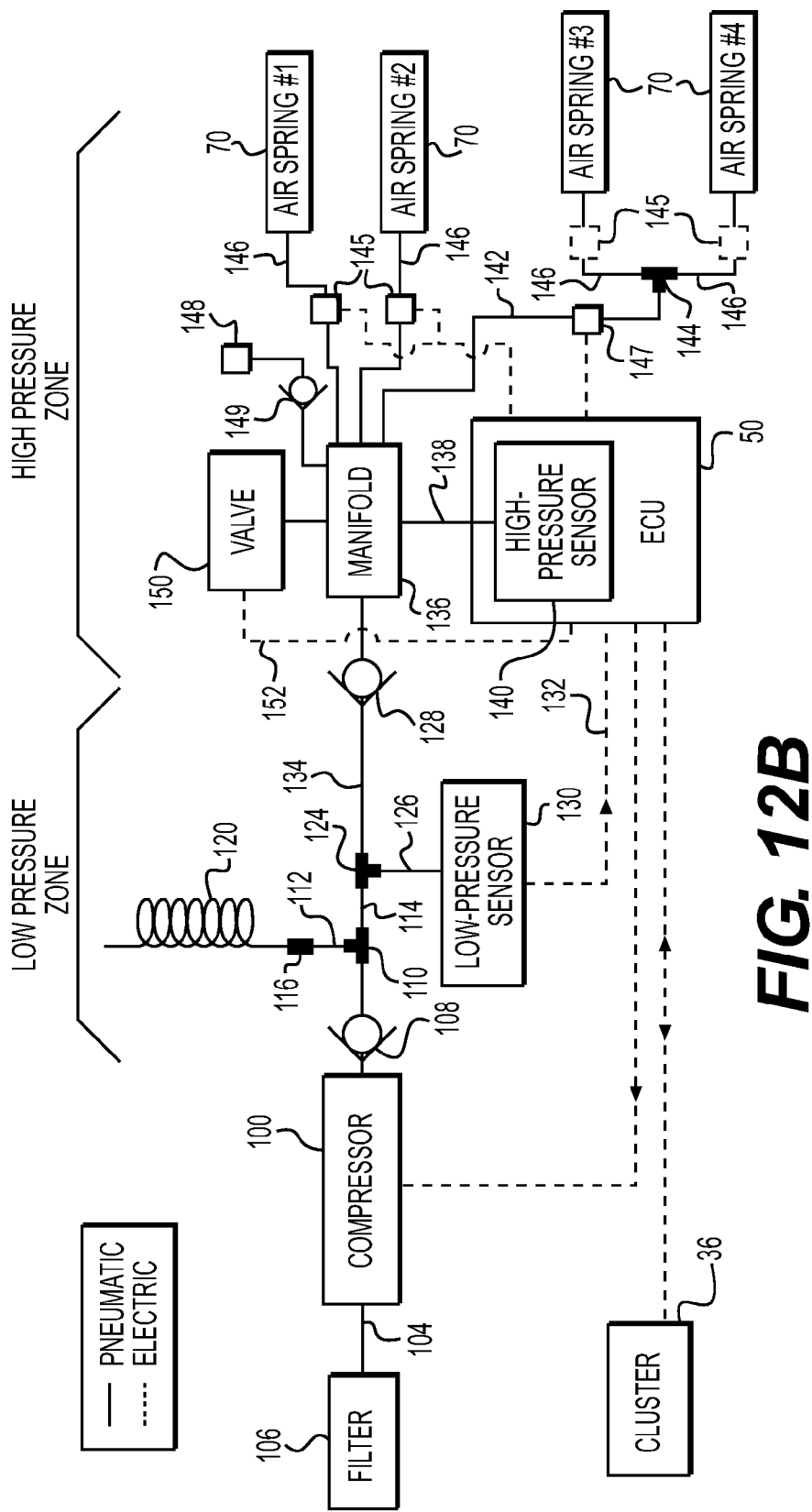
FIG. 12B is a schematic illustration of the alternative pneumatic system of FIG. 12A and of a corresponding electric system.

In the embodiment shown in FIGS. 12A and 12B, the front suspension assemblies 26 are provided with two front air springs 70 (air springs #1, 2) and the rear suspension assemblies are provided with two rear air springs 70 (air springs #3, 4). The manifold 136 has three outlets to the air springs 70. One of the outlets of the manifold 136 is connected to a valve 145, which is connected to one of the front air springs 70 (air spring #1) via air line 146. Another one of the outlets of the manifold 136 is connected to another valve 145, which is connected to another one of the front air springs 70 (air spring #2) via another air line 146. The opening and closing of the valves 145 is controlled by the ECU 50. By closing one or both of the valves 145, air from one of the front air springs 70 is prevented from moving to the other one of the front air springs 70 when the vehicle starts to roll for example. This helps to reduce the tendency of the ATV 10 to roll. As such, it is no longer necessary to provide a sway bar between the front wheels 18 to control the roll of the ATV 10. It is contemplated however, that a sway bar could nonetheless be used in combination with the valves 145. The remaining one of the outlets of the manifold 136 is connected to a valve 147, which is connected to a T-connector 144. The T-connector 144 splits the air flow between two air lines 146 connected to the rear air springs 70 to supply air to the rear air springs 70. The opening and closing of the valve 147 is controlled by the ECU 50. By closing the valve 147, air from the front air springs 70 is prevented from moving to the rear air springs 70 and vice versa, when the vehicle starts to pitch for example. This helps to reduce the tendency of the ATV 10 to pitch. It is contemplated that the valve 147 could be omitted. It is also contemplated that valves 145 (shown in dotted lines), could also be provided on the air lines 146 connected to the rear air springs 70 to prevent air from one of the rear air springs 70 from moving to the other one of the rear air springs 70. It is also contemplated that only the rear air springs 70 could be provided with valves 145. It is also contemplated that the embodiments described above with respect to FIG. 2 and below with respect to FIGS. 13 to 15 could also be provided with valves 145 and/or 146.

Also, as can be seen in FIG. 12A, in this embodiment, the air line 104 is connected to an upper half 54A of the air box 54 to further reduce the likelihood of water entering the air compressor 100. A check valve 149 has been added between the outlet 148 to the atmosphere and the manifold 136 to prevent the entry of water into the system. It is contemplated that the check valve 149 could also be provided in the embodiments described above with respect to FIG. 2 and below with respect to FIGS. 13 to 15.

Figure 13:
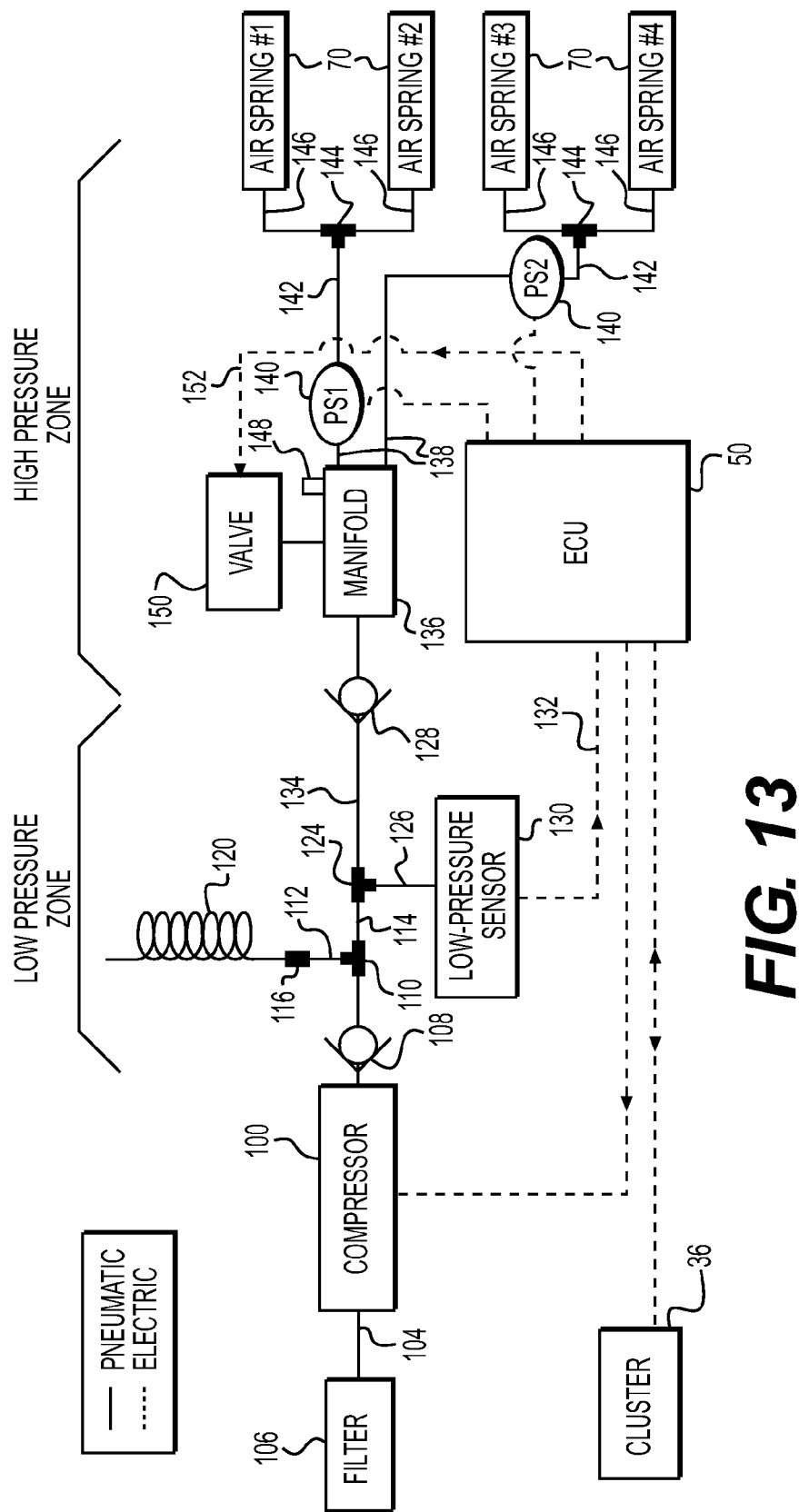
FIG. 13 is a schematic illustration of another alternative pneumatic system and electric system of the ATV of FIG. 1.

In the embodiment shown in FIG. 13, both the front and rear suspension assemblies 26, 28 are provided with air springs 70. However, in this embodiment, the manifold 136 has two outlets to the air springs 70. The valve 150 controls the air flow through the outlets of the manifold 136. One of the outlets is connected to the two front air springs 70 (air springs #1, 2), and the other of the outlets is connected to the two rear air springs 70 (air springs #3, 4). Each pair of air springs 70 is provided with its own high pressure sensor 140. Accordingly, the user can select an air pressure for the front air springs 70 which is different from the air pressure for the rear air springs 70.

Figure 14:
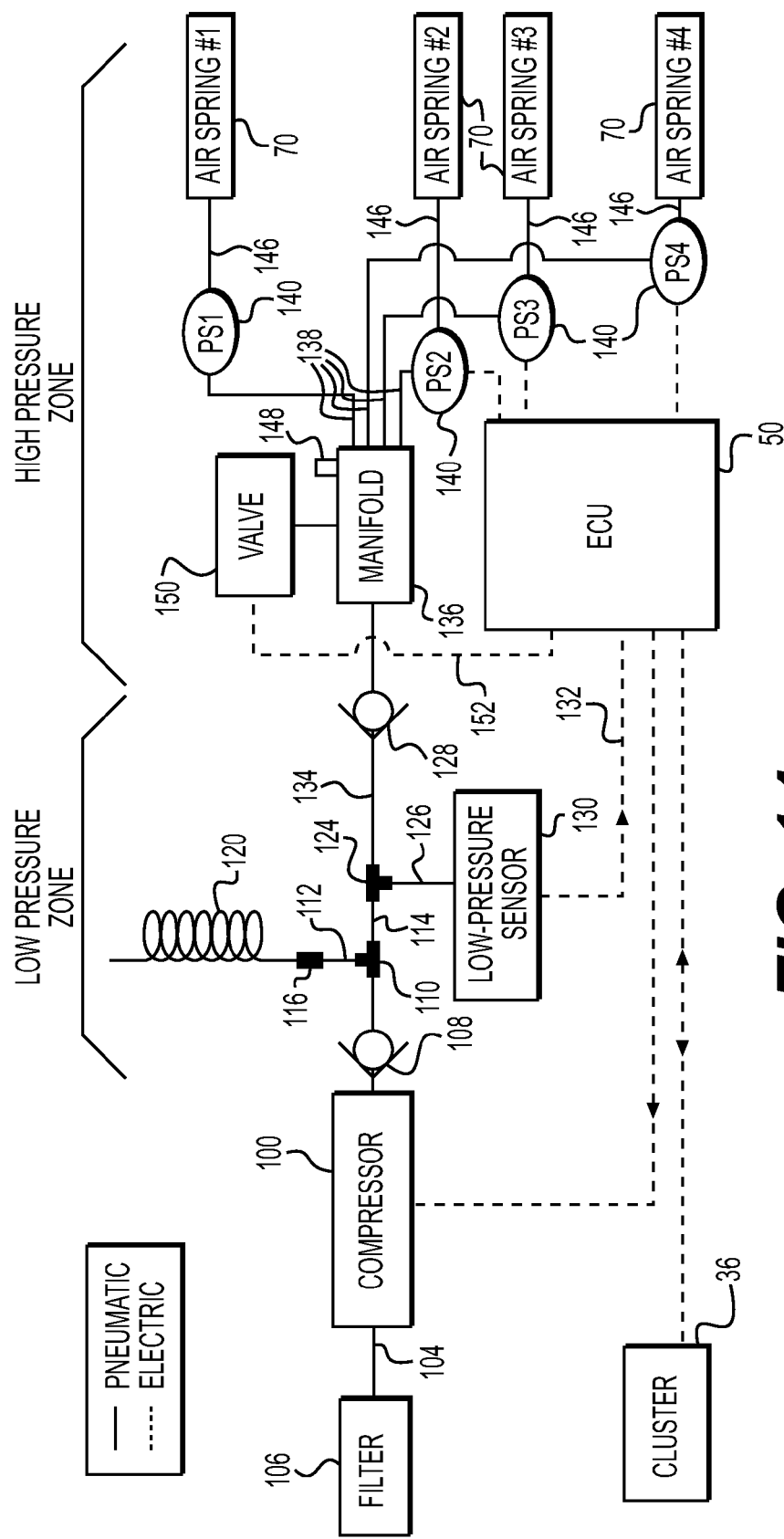
FIG. 14 is a schematic illustration of yet another alternative pneumatic system and electric system of the ATV of FIG. 1.

In the embodiment shown in FIG. 14, both the front and rear suspension assemblies 26, 28 are provided with air springs 70. However, in this embodiment, the manifold 136 has four outlets to the air springs 70. The valve 150 controls the air flow through the outlets of the manifold 136. Each of the outlets is connected to one of the air springs 70. Each air spring 70 is provided with its own high pressure sensor 140. Accordingly, the user can select different air pressures for each of the air springs 70. It is contemplated that instead of selecting air pressures for each to the air springs 70, that the user could select a degree and direction of tilt of the ATV 10 and that the ECU 50 would control the air compressor 100 and valve 150 accordingly.

Figure 15:
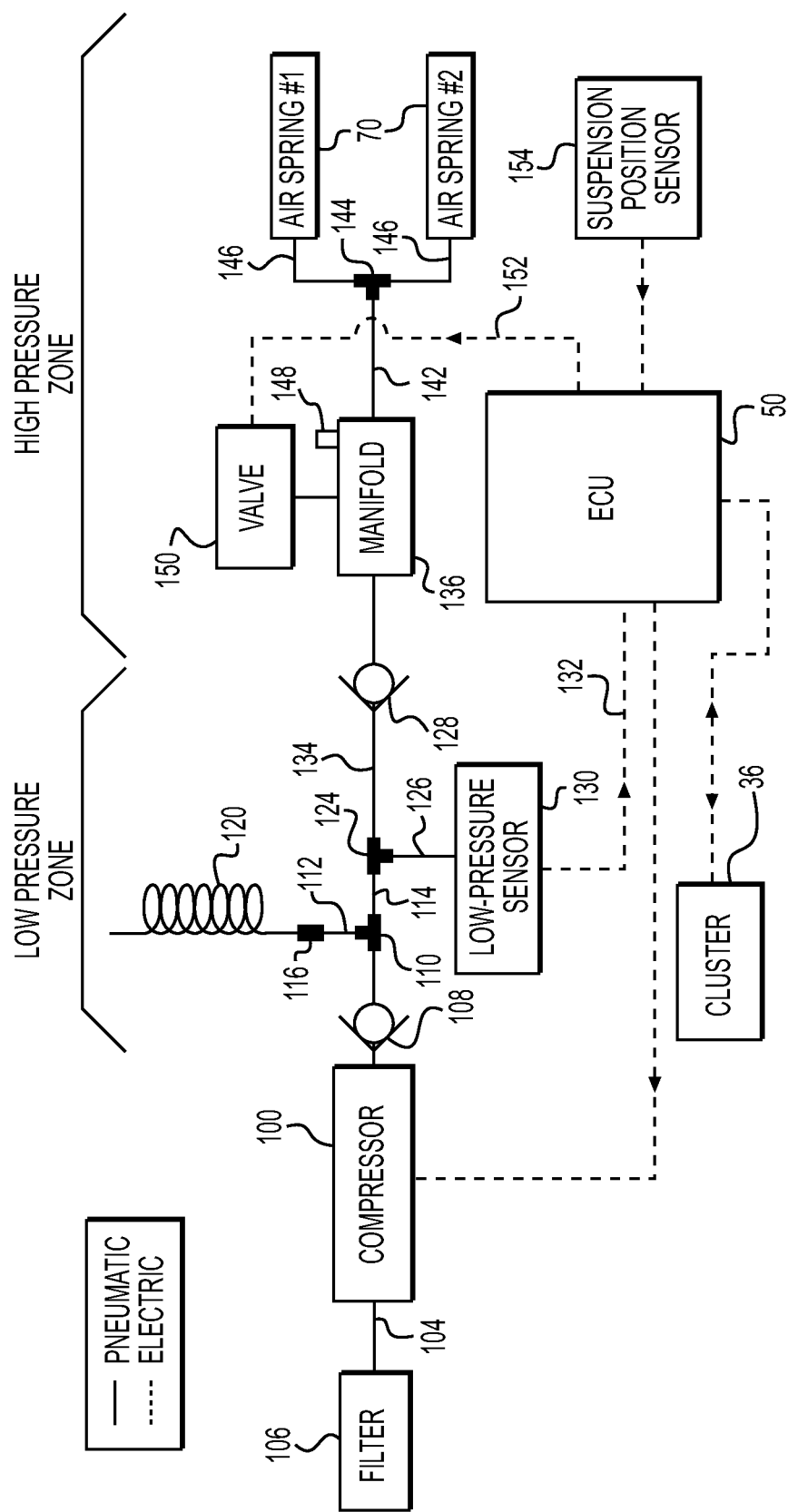
FIG. 15 is a schematic illustration of an alternative pneumatic system and electric system of the ATV of FIG. 1.

In the embodiment shown in FIG. 15, either the front or the rear suspension assemblies 26, 28 are provided with air springs 70, although it is contemplated that both could be provided with air springs 70. In this embodiment, the ATV 10 is provided with a suspension position sensor 154. The suspension position sensor 154 is connected to one of the suspension assemblies 26 or 28 having an air spring 70 so as to sense a degree of compression of the associated air spring 70 and sends a signal indicative of this position to the ECU 50. For example, as shown in FIG. 6, the suspension position sensor 154 is connected to the right swing arm 68. It is contemplated that multiple suspension position sensors 154 could be used (one for each suspension assembly 26, 28 having an air spring 70 for example), and that the suspension position sensor 154 could be connected to other portions of the suspension assemblies 26, 28. The amount by which the air spring 70 is compressed is known as sag. The sag is also indicative of the height of the frame 12 relative to the ground. In this embodiment, instead of selecting an air pressure, the user uses the set button 48 to select a desired height (either preset or any value within a range). This desired height is indicated on the gauge 44 (see the scale on the right hand side of the gauge 44 in FIG. 3). The ECU 50 then controls the air compressor 100 and the valve 150 to adjust the air pressure inside the air springs 70 until the desired height is obtained. While the ATV 10 is in motion, the ECU 50 would determine the height using a method similar to the method described above to determine an air pressure inside the air springs 70 while the ATV 10 is in motion. Since the control of the compressor 100 and the valve 150 is based on readings from the suspension position sensor 154, no high pressure sensor 140 is provided in this embodiment. However, it is contemplated that a high pressure sensor 140 could be provided.

It is contemplated that in FIGS. 2, 12B, and 13 to 15 discussed above, that the filter 106 could be substituted by the filter 55, or some other filter, in embodiments where the filter 106 is omitted.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A vehicle comprising:
a frame;
a first wheel connected to the frame;
a first suspension assembly connecting the first wheel to the frame, the first suspension assembly including a first air spring;
a second wheel connected to the frame;
a second suspension assembly connecting the second wheel to the frame, the second suspension assembly including a second air spring;
two third wheels connected to the frame;
two third suspension assemblies connecting the two third wheels to the frame, one of the two third suspension assemblies including a third air spring, and an other of the two third suspension assemblies includes including a fourth air spring,
the first wheel, the first suspension assembly, the second wheel, and the second suspension assembly being disposed at one end of the frame, and the two third wheels and the two third suspension assemblies being disposed at an opposite end of the frame;
a seat connected to the frame;
a steering assembly operatively connected to at least one of the wheels;
an engine connected to the frame and operatively connected to at least two of the wheels;
an air compressor connected to the frame and fluidly communicating with the first and second air springs for selectively supplying air to the first and second air springs,
during operation of the air compressor to supply air to the first and second air springs, the air compressor drawing air from the atmosphere and simultaneously supplying the air to the first and second air springs;
a first valve selectively fluidly communicating the air compressor with the first air spring;
a second valve selectively fluidly communicating the air compressor with the second air spring;
a third valve selectively fluidly communicating the first and second air springs with the third and fourth air springs; and
a control unit electrically connected to the air compressor for controlling an operation of the air compressor and electrically connected to the first, second and third valves for controlling positions of the valves.

2. The vehicle of claim 1, wherein the air compressor is disposed longitudinally between the first air spring and the third air spring.

3. A vehicle comprising:
a frame;
a first wheel connected to the frame;
a first suspension assembly connecting the first wheel to the frame, the first suspension assembly including a first air spring;
a second wheel connected to the frame;
a second suspension assembly connecting the second wheel to the frame, the second suspension assembly including a second air spring;
two third wheels connected to the frame;
two third suspension assemblies connecting the two third wheels to the frame, one of the two third suspension assemblies including a third air spring, and an other of the two third suspension assemblies including a fourth air spring,
the first wheel, the first suspension assembly, the second wheel, and the second suspension assembly being disposed at one end of the frame, and the two third wheels and the two third suspension assemblies being disposed at an opposite end of the frame;
a seat connected to the frame;
a steering assembly operatively connected to at least one of the wheels;
an engine connected to the frame and operatively connected to at least two of the wheels;
an air compressor connected to the frame and fluidly communicating with the first and second air springs for selectively supplying air to the first and second air springs,
during operation of the air compressor to supply air to the first and second air springs, the air compressor drawing air from the atmosphere and simultaneously supplying the air to the first and second air springs;
a first valve selectively fluidly communicating the air compressor with the first air spring;
a second valve selectively fluidly communicating the air compressor with the second air spring;
a third valve selectively fluidly communicating the air compressor with the third air spring;
a fourth valve selectively fluidly communicating the air compressor with the fourth air spring, the third and fourth valves selectively fluidly communicating the third and fourth air springs with each other; and
a control unit electrically connected to the air compressor for controlling an operation of the air compressor and electrically connected to the first, second, third and fourth valves for controlling positions of the valves.

4. A vehicle comprising:
a frame;
a first wheel connected to the frame;
a first suspension assembly connecting the first wheel to the frame, the first suspension assembly including a first air spring;
a second wheel connected to the frame;
a second suspension assembly connecting the second wheel to the frame, the second suspension assembly including a second air spring;
at least one third wheel connected to the frame;
at least one third suspension assembly connecting the at least one third wheel to the frame,
the first wheel, the first suspension assembly, the second wheel, and the second suspension assembly being disposed at one end of the frame, and the at least one third wheel and the at least one third suspension assembly being disposed at an opposite end of the frame;
a seat connected to the frame;
a steering assembly operatively connected to at least one of the wheels;
an engine connected to the frame and operatively connected to at least one of the wheels;
an air compressor connected to the frame and fluidly communicating with the first and second air springs for selectively supplying air to the first and second air springs,
during operation of the air compressor to supply air to the first and second air springs, the air compressor drawing air from the atmosphere and simultaneously supplying the air to the first and second air springs;
a first valve selectively fluidly communicating the air compressor with the first air spring;
a second valve selectively fluidly communicating the air compressor with the second air spring, the first and second valves selectively fluidly communicating the first and second air springs with each other; and a control unit electrically connected to the air compressor for controlling an operation of the air compressor and electrically connected to the first and second valves for controlling positions of the valves.

5. The vehicle of claim 4, further comprising a manifold fluidly connected to the air compressor and the first and second air springs;
   wherein air from the air compressor is supplied to the manifold prior to being supplied to the first and second air springs.

6. The vehicle of claim 5, further comprising:
   a third valve selectively fluidly communicating the air springs with an outlet to the atmosphere for releasing air from the air springs, the outlet to the atmosphere fluidly communicating with the manifold, air from the first and second air springs being supplied to the manifold prior to being supplied to the outlet to the atmosphere, the control unit being electrically connected to the third valve for controlling a position of the third valve; and
   a check valve fluidly disposed between the outlet to the atmosphere and the manifold, the check valve permitting fluid flow from the manifold to the outlet to the atmosphere and preventing fluidly flow from the outlet to the atmosphere to the manifold.

7. The vehicle of claim 4, further comprising:
   a third valve selectively fluidly communicating the air springs with an outlet to the atmosphere for releasing air from the air springs, the control unit being electrically connected to the third valve for controlling a position of the third valve; and
   a selector for selecting a value of an attribute associated with the first and second air springs, the control unit receiving a signal indicative of the value from the selector and controlling the operation of the air compressor and the positions of the first, second, and third valves based at least on the value.

8. The vehicle of claim 4, further comprising an auxiliary air output fluidly communicating with the air compressor for selectively supplying air from the air compressor to a device other than the at least one air spring.

9. The vehicle of claim 8, further comprising a check valve fluidly disposed between the auxiliary air output and the air compressor, the check valve permitting fluid flow from the air compressor to the auxiliary air output and preventing fluidly flow from the auxiliary air output to the air compressor.

10. A vehicle comprising:
    a frame;
    a first wheel connected to the frame;
    a first suspension assembly connecting the first wheel to the frame, the first suspension assembly including a first air spring;
    a second wheel connected to the frame;
    a second suspension assembly connecting the second wheel to the frame, the second suspension assembly including a second air spring;
    at least one third wheel connected to the frame;
    at least one third suspension assembly connecting the at least one third wheel to the frame,
    the first wheel, the first suspension assembly, the second wheel, and the second suspension assembly being disposed at one end of the frame, and the at least one third wheel and the at least one third suspension assembly being disposed at an opposite end of the frame;
    a seat connected to the frame;
    a steering assembly operatively connected to at least one of the wheels;
    an engine connected to the frame and operatively connected to at least one of the wheels;
    an air compressor connected to the frame and fluidly communicating with the first and second air springs for selectively supplying air to the first and second air springs, the air compressor being located below the seat;
    during operation of the air compressor to supply air to the first and second air springs, the air compressor drawing air from the atmosphere and simultaneously supplying the air to the first and second air springs;
    a first valve selectively fluidly communicating the air compressor with the first air spring;
    a second valve selectively fluidly communicating the air compressor with the second air spring; and
    a control unit electrically connected to the air compressor for controlling an operation of the air compressor and electrically connected to the first and second valves for controlling positions of the valves.

11. The vehicle of claim 10, wherein the air compressor is disposed higher than a center of the first, the second, and the at least one third wheels.

12. The vehicle of claim 10, further comprising an auxiliary air output fluidly communicating with the air compressor for selectively supplying air from the air compressor to a device other than the at least one air spring.

13. The vehicle of claim 12, further comprising a check valve fluidly disposed between the auxiliary air output and the air compressor, the check valve permitting fluid flow from the air compressor to the auxiliary air output and preventing fluidly flow from the auxiliary air output to the air compressor.

14. The vehicle of claim 10, further comprising a manifold fluidly connected to the air compressor and the first and second air springs;
    wherein air from the air compressor is supplied to the manifold prior to being supplied to the first and second air springs.

15. The vehicle of claim 14, further comprising:
    a third valve selectively fluidly communicating the air springs with an outlet to the atmosphere for releasing air from the air springs, the outlet to the atmosphere fluidly communicating with the manifold, air from the first and second air springs being supplied to the manifold prior to being supplied to the outlet to the atmosphere, the control unit being electrically connected to the third valve for controlling a position of the third valve; and
    a check valve fluidly disposed between the outlet to the atmosphere and the manifold, the check valve permitting fluid flow from the manifold to the outlet to the atmosphere and preventing fluidly flow from the outlet to the atmosphere to the manifold.

16. The vehicle of claim 10, further comprising:
    a third valve selectively fluidly communicating the air springs with an outlet to the atmosphere for releasing air from the air springs, the control unit being electrically connected to the third valve for controlling a position of the third valve; and
    a selector for selecting a value of an attribute associated with the first and second air springs, the control unit receiving a signal indicative of the value from the selector and controlling the operation of the air compressor and the positions of the first, second, and third valves based at least on the value.

* * * * *